B. E. EICHENDORFF.
ATTACHMENT FOR DIESTOCKS.
APPLICATION FILED MAR. 22, 1919.
1,352,253.
Patented Sept. 7, 1920.
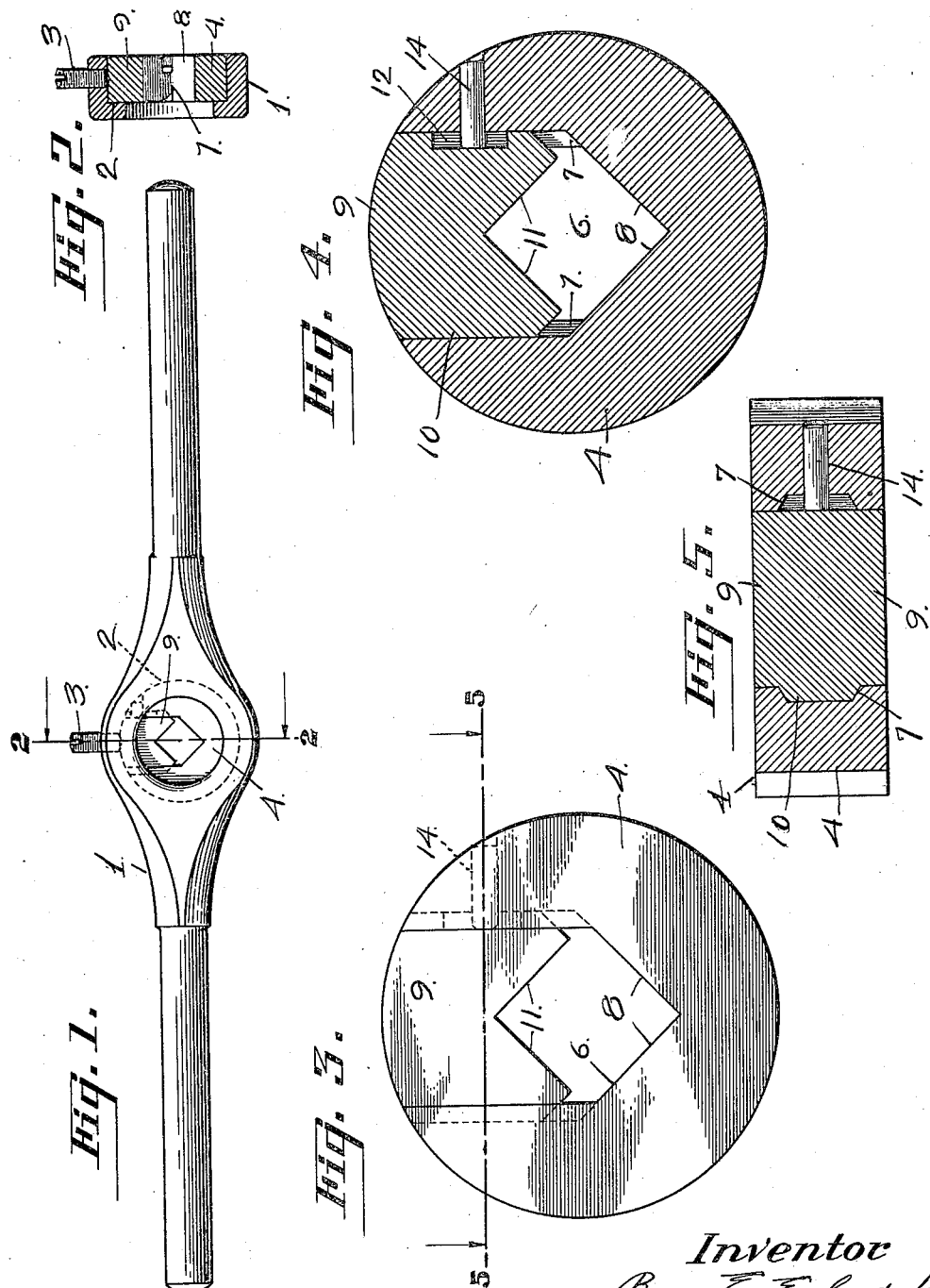

UNITED STATES PATENT OFFICE.

BRUNO E. EICHENDORFF, OF SAN FRANCISCO, CALIFORNIA.

ATTACHMENT FOR DIESTOCKS.

1,352,253.

Specification of Letters Patent.     Patented Sept. 7, 1920.

Application filed March 22, 1919. Serial No. 284,475.

*To all whom it may concern:*

Be it known that I, BRUNO E. EICHENDORFF, a citizen of the United States, residing in the city and county of San Francisco and State of California, have invented a certain new and useful Improvement in Attachments for Diestocks, of which the following is a specification.

My invention relates to improvements in die stocks and the like wherein a member slidably mounted within a slotted disk seated within the stock operates to rigidly engage other tools than the die.

The present invention has for its primary object the provision of an attachment whereby one stock may be adapted to hold either a die or the shank of a tap drill, reamer or other tools so that only one stock need be carried in the tool kit of a mechanic, thereby lessening the weight of said tool kit as well as eliminating the expense incident to the provision of a second stock.

A further object of the present invention is to provide an improved attachment for a die stock arranged to be operated by the securing screw thereof to rigidly engage the shank of a tap drill or the like.

I accomplish these several objects by means of the improved device disclosed in the drawings forming a part of the present specification wherein like characters of reference are used to designate similar parts throughout the said specification and drawings, and in which:

Figure 1 is a plan view of a die stock disclosing my improvement attached thereto;

Fig. 2 is a vertical sectional view taken on line 2—2 of Fig. 1 in the direction indicated;

Fig. 3 is an enlarged view of my improved attachment removed from the die stock;

Fig. 4 is a vertical sectional view of Fig. 3; and

Fig. 5 is a horizontal section taken on line 5—5 of Fig. 3.

Referring to the drawings the numeral 1 is used to designate a die stock of the usual type having the usual annular or circular seat 2 therein for the reception of the die not shown. A securing screw 3 is screw-threaded into the stock radially to the seat 2.

A disk 4 is provided with a centrally disposed slot 6 having grooves 7 in the side walls thereof and converging V-shaped inner end as shown at 8.

A slide 9 is provided with ridges 10 on the sides thereof to slidably engage the grooves 7 in the walls of the slot 6, said slide 9 being also provided with a V-shaped recess 11 on its inner end, said V-shaped recess 11 being arranged to form, with the V-shaped ends 8 of the slot 6, a substantially rectangular aperture for the reception of the shank of a tap drill, reamer or other similar tool not shown.

One of the ridges 10 is provided with a recess 12 into which projects the end of a pin 14 to limit the outward movement of the slide 9 and thereby prevent the same from emerging entirely from the slot 6.

In operation the die, not shown, is first removed from the annular seat 2 and the disk 4 with its sliding member 9 is placed or mounted within said seat 2. The shank of a tap drill or other tool, not shown, is then placed within the substantially square aperture formed by the junction of the V-shaped ends 8 and 11 of the disk 4 and slide 9 respectively and the securing screw 3, which is a usual part of the die stock 1, is then actuated to engage the outer end of the slide 9 and move the V-shaped recess 1 on the inner end thereof into engagement with the shank of a tap drill or other tool, not shown, and move said shank into and against the V-shaped end 8 of the slot 6 until said shank is rigidly engaged.

The impingement of the securing screw 3 upon the slide 9 is sufficient to prevent the rotation of the disk 4 within its annular seat 2 and a hole may be tapped, reamed or countersunk, according to the nature of the tool, by rotating said tool by means of the stock 1 in the usual manner.

It is obvious from the foregoing that I have provided a new and improved attachment for die stocks adapted to engage and operate a tap drill or the like thereby eliminating the necessity for a special stock for said drills.

Having thus described my invention, what I claim as new and desire to secure by Letters Patent is:

1. The combination with a die stock of a slotted disk; a slide mounted within the disk and arranged to form a squared aperture with the slot in the disk; and means for moving the slide to engage the shank of a tool.

2. The combination with a die stock of a slotted disk; a slide mounted within the disk and arranged to form a squared aperture with the slot in the disk; means for moving the slide to engage the shank of a tool; and means for limiting the movement of the slide within the disk.

3. The combination with a die stock having a central circular seat therein of a disk arranged to seat within said seat and provided with a slot having a V-shaped inner end; and a slide mounted within the slot and provided with a V-shaped recess arranged to form a substantially square opening with the V-shaped end of the slot.

4. The combination with a die stock having a central circular seat therein of a disk arranged to seat within said seat and provided with a slot having a V-shaped inner end; a slide mounted within the slot and provided with a V-shaped recess arranged to form a substantially square opening with the V-shaped end of the slot; and means for limiting the movement of the slide within the disk.

5. The combination with a die stock having a die seat and die securing screw mounted therein of a slotted disk mounted within said seat; a slide movably mounted within the slot and arranged to engage a tap within the slot and arranged to engage a tap between the inner end of said slide and the inner end of the slot, said slide being engageable by the die securing screw in the die stock to move said slide onto a tool in the inner end of the slot whereby said tool may be rigidly secured.

6. The combination with a die stock having a die seat and die securing screw mounted therein of a slotted disk mounted within said seat; a slide movably mounted within the slot and arranged to engage a tap between the inner end of said slide and the inner end of the slot, said slide being engageable by the die securing screw in the die stock to move said slide onto a tool in the inner end of the slot whereby said tool may be rigidly secured; and means for limiting the movement of the slide within the slot to retain said slide within said slot.

7. The combination with a die stock having a die seat and die securing screw mounted therein of a slotted disk mounted within said seat; a slide movably mounted within the slot and arranged to engage a tap between the inner end of said slide and the inner end of the slot, said slide being engageable by the die securing screw in the die stock to move said slide onto a tool in the inner end of the slot whereby said tool may be rigidly secured; and a pin mounted within the disk to limit the movement of the slide in the slot.

8. The combination with a die stock having a die seat therein and a die securing screw of a slotted disk mounted within the seat and having the inner end of the said slot V-shaped; a slide movably mounted within the slot and having a V-shaped inner end arranged to form a substantially square aperture with the V-shaped inner end of the slot and likewise provided with a recess in one side thereof, said slide being engageable by the die securing screw to move the V-shaped inner end of said slide onto the shank of a tool held in the inner end of the slot whereby said tool may be rigidly engaged; and a pin mounted within the disk and engaging the recess in the side of the slide to limit the movement of said slide outwardly from the slot.

In witness whereof I hereunto set my signature.

BRUNO E. EICHENDORFF.